(12) United States Patent
Harada

(10) Patent No.: US 8,112,808 B2
(45) Date of Patent: Feb. 7, 2012

(54) SERVER APPARATUS AND INSTALLATION INFORMATION MAKING METHOD

(75) Inventor: Toru Harada, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 1007 days.

(21) Appl. No.: 12/073,498

(22) Filed: Mar. 6, 2008

(65) Prior Publication Data

US 2008/0235803 A1 Sep. 25, 2008

(30) Foreign Application Priority Data

Mar. 19, 2007 (JP) ................. 2007-071489

(51) Int. Cl.
*G06F 21/00* (2006.01)
(52) U.S. Cl. .......................... 726/26; 726/30
(58) Field of Classification Search .............. 726/26, 726/30
See application file for complete search history.

(56) References Cited

U.S. PATENT DOCUMENTS

| | | | |
|---|---|---|---|
| 2003/0084306 A1* | 5/2003 | Abburi et al. | 713/188 |
| 2005/0289075 A1* | 12/2005 | Murphy et al. | 705/59 |
| 2007/0143222 A1* | 6/2007 | Chicks et al. | 705/59 |

FOREIGN PATENT DOCUMENTS

| | | |
|---|---|---|
| JP | 2004-303221 | 10/2004 |
| JP | 2004-303222 | 10/2004 |

* cited by examiner

*Primary Examiner* — Nasser Moazzami
*Assistant Examiner* — Lisa Lewis
(74) *Attorney, Agent, or Firm* — Harness, Dickey & Pierce, P.L.C.

(57) ABSTRACT

A license server generates USB serial IDs for USB memory secured in a multi-function machine and then makes electronic signature files using the USB serial IDs and firmware that is the target of installation at the multi-function machine. The license server further makes electronic signature files using the firmware installer and SD card serial IDs. The license server then stores data for installation use including the electronic signature files in an SD card inserted in a client device connected to the license server.

20 Claims, 10 Drawing Sheets

FIG. 7

| |
|---|
| SETTINGS FILE |
| ELECTRONIC SIGNATURE FILE |
| ELECTRONIC SIGNATURE FILE |
| ELECTRONIC SIGNATURE FILE |
| ELECTRONIC SIGNATURE FILE |
| ELECTRONIC SIGNATURE FILE |
| FIRMWARE |
| ELECTRONIC SIGNATURE FILE |
| BOOT PROGRAM |
| ELECTRONIC SIGNATURE FILE |
| ROOT FILE SYSTEM |
| ELECTRONIC SIGNATURE FILE |
| INSTALLER |
| ELECTRONIC SIGNATURE FILE |
| ROOT FILE SYSTEM |
| ELECTRONIC SIGNATURE FILE |
| USB SERIAL ID INFORMATION FILE |
| ELECTRONIC SIGNATURE FILE |
| PUBLIC KEY |

FIG. 8

```
# serial ID:     ← SERIAL ID LINE (TERMINATED WITH ":")
#       filename1  ← FILE NAME LINE (FILE CORRELATED USING SERIAL ID)
#       filename2  ← FILE NAME LINE (MULTIPLE DESCRIBED IF MULTIPLE
PRESENT)
#         .
#         .
XXXX0000:
        /init.d/printer_XXXX0000.lic
XXXX0001:
        /init.d/printer_XXXX0001.lic
XXXX0002:
        /init.d/printer_XXXX0002.lic
XXXX0003:
        /init.d/printer_XXXX0003.lic
XXXX0004:
        /init.d/printer_XXXX0004.lic
```

FIG. 11

| SETTINGS FILE |
|---|
| ELECTRONIC SIGNATURE FILE |
| ELECTRONIC SIGNATURE FILE |
| ELECTRONIC SIGNATURE FILE |
| ELECTRONIC SIGNATURE FILE |
| ELECTRONIC SIGNATURE FILE |
| FIRMWARE |
| ELECTRONIC SIGNATURE FILE |
| ELECTRONIC SIGNATURE FILE |
| ELECTRONIC SIGNATURE FILE |
| ELECTRONIC SIGNATURE FILE |
| ELECTRONIC SIGNATURE FILE |
| BOOT PROGRAM |
| ELECTRONIC SIGNATURE FILE |
| ROOT FILE SYSTEM |
| ELECTRONIC SIGNATURE FILE |
| INSTALLER |
| ELECTRONIC SIGNATURE FILE |
| ROOT FILE SYSTEM |
| ELECTRONIC SIGNATURE FILE |
| USB SERIAL ID INFORMATION FILE |
| ELECTRONIC SIGNATURE FILE |
| PUBLIC KEY |

SERVER APPARATUS AND INSTALLATION INFORMATION MAKING METHOD

CROSS-REFERENCE TO RELATED APPLICATIONS

The present application claims priority to and incorporates by reference the entire contents of Japanese priority document 2007-071489 filed in Japan on Mar. 19, 2007.

BACKGROUND OF THE INVENTION

1. Field of the Invention

The present invention relates to a server apparatus and installation information making method for installing programs in information processing devices such as image forming devices.

2. Description of the Related Art

In image forming devices having functions such as printers and facsimiles, programs such as firmware are stored on a storage medium such as an SD (Secure Digital) memory card. The programs are then read from the storage mediums at the time of starting up the programs and are executed. Such multi-function image forming devices have been disclosed in Japanese Patent Application Laid-open No. 2004-303222 and Japanese Patent Application Laid-open No. 2004-303221. With this technology, in order to prevent falsification and unauthorized reproduction of programs recorded on the SD card, a license server is provided. A program is then stored within the SD card so that a serial ID of the SD card and the program are correlated via the license server. Correlation of the serial ID and the program is carried out, for example, by making an electronic signature file for the program using the serial ID. The program can then be safely installed at the SD card by carrying out authentication using the electronic signature file.

However, when a detachable storage medium such as an SD card is used, it is necessary to prepare a card slot for securing the SD card at the image forming device. There is therefore the fear that this will be expensive compared to using a storage medium provided within the image forming device. There is also the fear that it will no longer be possible to access programs stored in an SD card as a result of problems such as contacts failing while the SD card is inserted in a multi-function machine (multi-function image forming device) or the fear of the SD card itself being removed and becoming lost. It has therefore become desirable in recent years for firmware to be stored at a storage medium provided within a multi-function machine. With technology of the conventional device, it has been necessary to prevent unauthorized duplication of firmware stored in an SD card. Duplication of firmware stored on an SD card to a storage medium within an image forming device has therefore not been straightforward. Replacing of the technology of the conventional art where firmware is safely stored on an SD card so that the firmware is stored on a storage medium within an image forming device has therefore not been straightforward.

SUMMARY OF THE INVENTION

It is an object of the present invention to at least partially solve the problems in the conventional technology.

According to an aspect of the present invention, a server apparatus is for storing a program targeted for installation on a first information processing device in a detachable storage medium. The server apparatus includes an identification information unit that makes identification information for the first information processing device that is the target of installation; a medium identification information unit that acquires storage medium identification information assigned to the storage medium and stored in the storage medium; a first license unit that makes first license information using the identification information acquired by the identification information unit; a second license unit that makes second license information using the storage medium identification information acquired by the medium identification information unit; and a storage controller that stores, in the storage medium, the first license information made by the first license unit, the second license information made by the second license unit, and program information including the target program.

According to another aspect of the present invention, a method is for storing a program targeted for installation on an information processing device in a detachable storage medium. The method includes making identification information for the information processing device that is the target of installation; acquiring storage medium identification information assigned to the storage medium and stored in the storage medium; making first license information using the identification information made by the making the identification information; making second license information using the storage medium identification information acquired by the acquiring the storage medium identification information; and storing, in the storage medium, the first license information made by the making the first license information, the second license information made by the making the second license information, and program information including the target program.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a block view of the data configuration depicted in FIG. 6 shown in block form according to the embodiment;

FIG. 8 is a view of example data for a USB serial ID information file according to the embodiment;

FIG. 11 is a block view of the data configuration depicted in FIG. 10 shown in block form according to the same modified example.

DETAILED DESCRIPTION OF THE PREFERRED EMBODIMENT

The following is a detailed description with reference to the appended drawings of an exemplary embodiment of the server apparatus and installation information making method of the present invention.

Figure 1:
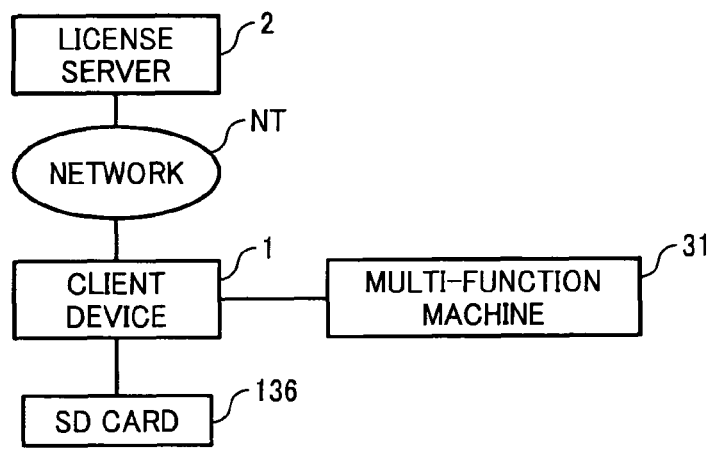
FIG. 1 is a block view depicting an example configuration for an installation system according to an embodiment of the present invention.

FIG. 1 is a block view depicting an example configuration for an installation system according to an embodiment. In the installation system of this embodiment, a client device 1 and a license server 2 are connected via a network NT. An SD card 136 is secured to the client device 1 in a detachable manner. The SD card 136 can also be secured to a multi-function machine (multi-function image forming apparatus) 31 in a detachable manner. Data relating to installation of the firmware is then downloaded to the SD card 136 from the license server 2 according to operations by the user at the client device 1 to which the SD card 136 is secured. When the user then removes the SD card 136 from the client device 1 and secures the SD card 136 to the multi-function machine 31, the firmware downloaded to the SD card 136 is installed in the multi-function machine 31.

Next, an explanation is given of a configuration for the license server 2. The license server 2 includes a central processing unit (CPU), a system memory, a communication controller, and storage devices such as a hard disk drive (HDD), all connected together by a communication bus (none of which are shown in the drawings). This is the hardware configuration utilizing a typical computer. The CPU controls the whole of the license server 2 by executing programs stored in the system memory or HDD. The communication controller controls communication between license server 2 and other devices. The system memory stores each of the various programs and data. The HDD also stores various programs and data.

Figure 2:
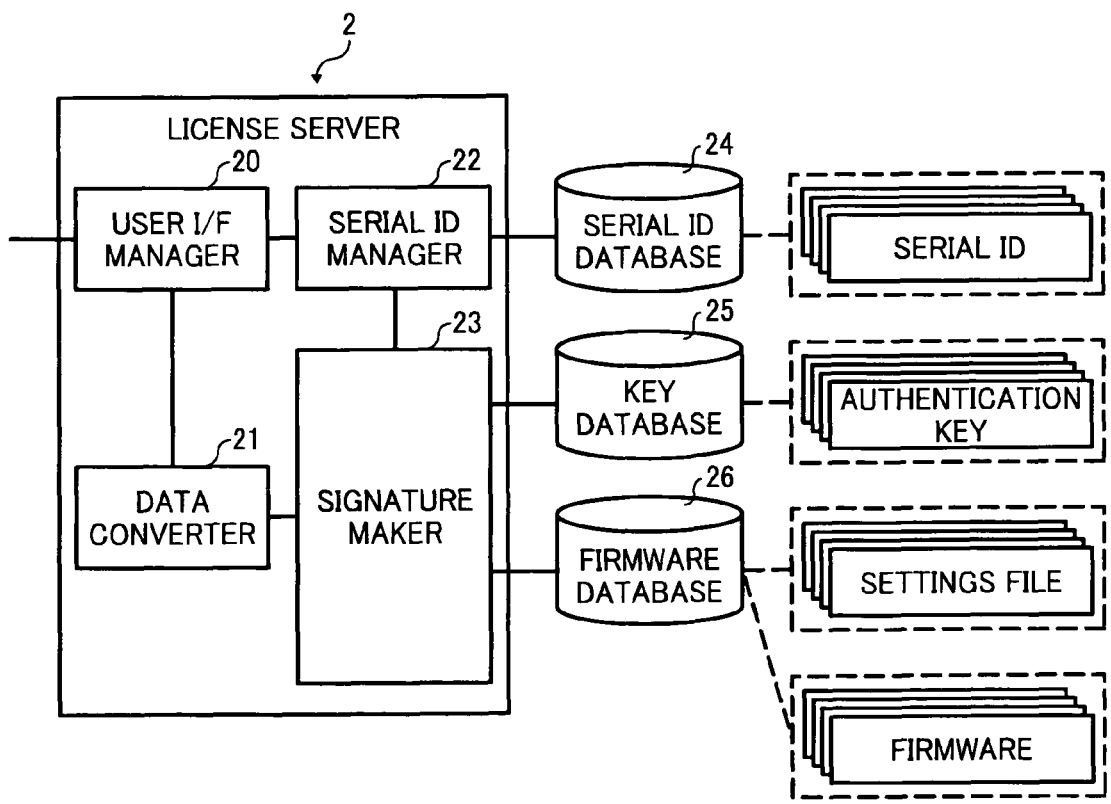
FIG. 2 is a block view depicting an example of a functional structure for the license server and a database stored in the HDD according to the embodiment.

Next, functions implemented at the license server 2 as a result of the CPU of the license server 2 executing programs stored in the system memory and the HDD are explained. FIG. 2 is a block view depicting an example of a functional structure for the license server 2 and a database stored in the HDD. The license server 2 has each of the functions for a user interface (I/F) manager 20, a data converter 21, a serial ID manager 22, and a signature maker 23. The HDD of the license server 2 stores a serial ID database 24, a key database 25, and a firmware database 26.

The user I/F manager 20 controls sending and receiving of data to and from the client device 1. When there is a request from the client device 1 for firmware that is the subject of installation, the data converter 21 acquires the firmware and settings files of the target of installation as well as installer and boot files. The data converter 21 also obtains the signature files created by the signature maker 23 in accordance with the acquired files and then makes data to be sent to the client device 1 using the electronic signature files and acquired files. The serial ID manager 22 then makes new USB serial IDs for storing in the serial ID database 24 and reads and deletes serial IDs recorded in the serial ID database 24 in accordance with requests from the data converter 21. The signature maker 23 then makes electronic signature files according to requests from the data converter 21.

A USB serial ID prepared by the license server 2 for a USB memory 115 that is the target of software installation is stored in the serial ID database 24. Public keys for creating electronic signature files for the firmware that is the target of installation and settings files, and the installer and boot files are stored in the key database 25. Firmware that is the target of installation at the multi-function machine 31 and settings files, and an installer, boot program for starting up the firmware, and root file system are stored in the firmware database 26. In the following, the boot program and root file system are collectively referred to as a "boot file". The firmware, settings files, installer and boot files are correlated at the product information of the multi-function machine 31.

The client device 1 includes a CPU, system memory, communication controller, storage device such as an HDD, SD card slot, SD card communicator, operation device for inputting operations from a user, display device that displays information, and communication bus for connecting together all of these components (none of which are shown in the drawings). The SD card 136 is detachably inserted in the SD card slot. The SD card communication unit carries out communication with the SD card 136 inserted in the SD card slot, reads data stored in the SD card 136 and stores various data on the SD card.

The SD card 136 includes a non-volatile storage medium and is extractably insertable to the multi-function machine 31 and the client device 1. The SD card 136 stores a uniquely identifiable SD card serial ID therein.

Figure 3:
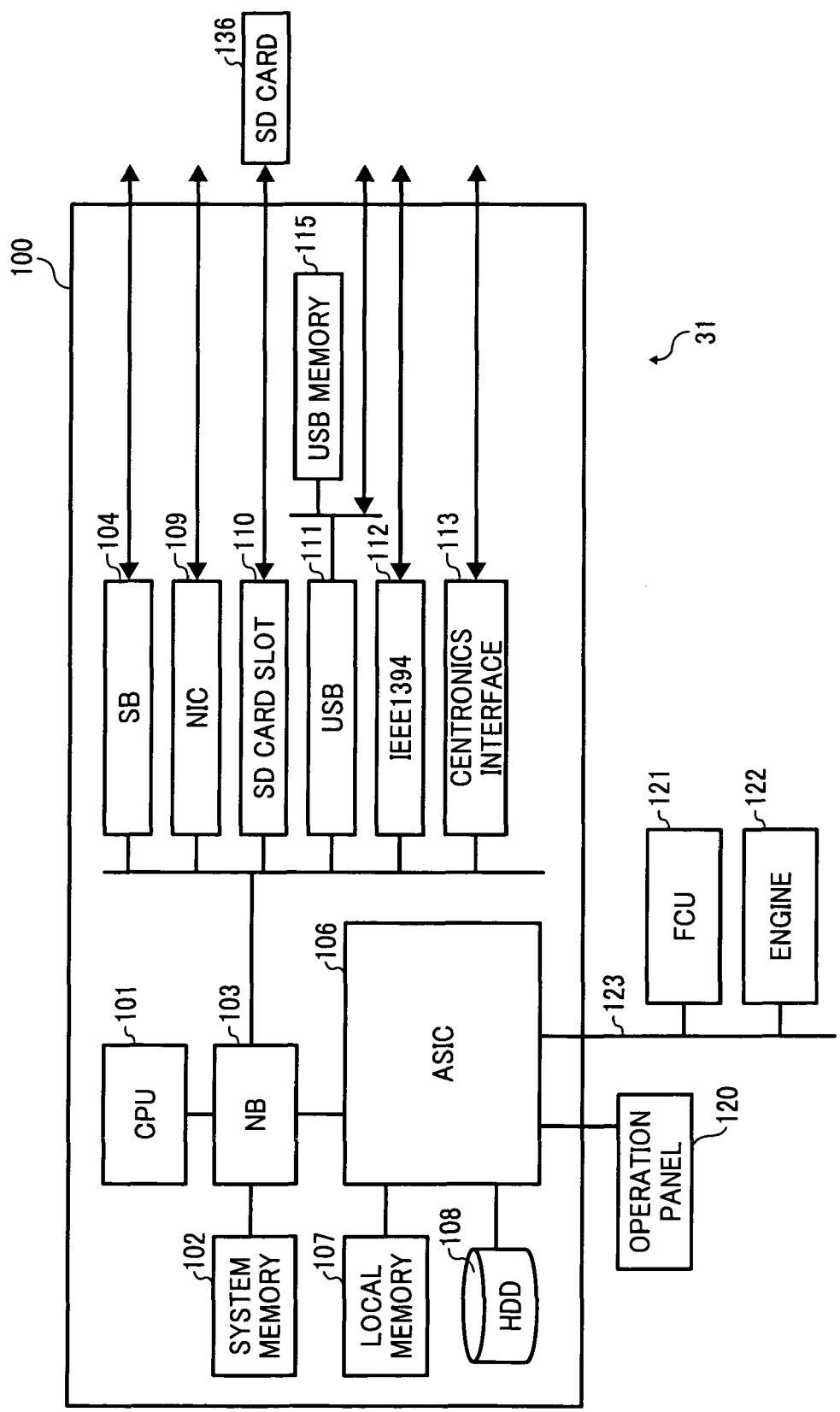
FIG. 3 is a block view depicting an example hardware configuration for a multi-function machine according to the embodiment.

FIG. 3 is a block view depicting a hardware configuration for the multi-function machine 31. The multi-function machine 31 includes a controller 100, an operation panel 120, an FCU 121 and an engine 122. The controller 100 includes a CPU 101, a system memory 102, a north bridge (NB) 103, a south bridge (SB) 104, an ASIC 106, a local memory 107, a hard disc drive (HDD) 108, a network interface card (NIC) 109, and an SD card slot 110, a USB device 111, an IEEE 1394 device 112, and a centronics interface 113.

The CPU 101 performs overall control of the multi-function machine 31. For example, the CPU 101 starts up and executes program in conjunction with an OS (operating system). The NB 103 is a bridge circuit. The SB 104 is a bridge circuit that connects a PCI bus (not shown), a ROM, and peripheral devices etc. The system memory 102 is used for depicting pictures of the multi-function machine 31. Product information of the multi-function machine 31 (for example, product model number, pattern number etc.) is stored in the system memory 102. The local memory 107 is used as an image buffer for copying use, and as a code buffer. The ASIC 106 is an IC specified to image processing use having hardware elements of image processing circuits. The HDD 108 is an example of storage (auxiliary storage device) that stores image data, document data, programs and font data etc. The NIC 109 is interface equipment that connects the multi-function machine 31 to the network.

The SD card slot 110 can extractably receive the SD card 136. Interrupt processing corresponding to the insertion or removal of an SD card is carried out by an SD card status monitor driver. The USB device 111, the IEEE 1394 device 112 and the centronics interface 113 are interfaces conforming to the respective standards. The USB memory 115 is connected to the USB device 111. The USB memory 115 includes a read/writable non-volatile storage medium and is fixed to the multi-function machine 31 in this embodiment.

The operation panel 120 receives input operations by an operator and displays items for the operator. The FCU 121 has a memory and is utilized, for example, in the temporary storage of facsimile data received when the power supply of the multi-function machine 31 is off.

When the SD card 136 stores with the firmware subject to installation is inserted into the SD card slot 110, the multi-function machine 31 performs an authentication check on the various data containing the firmware. When each authentication check is successful, the firmware is then stored on the USB memory 115 of the multi-function machine 31.

Figure 4:
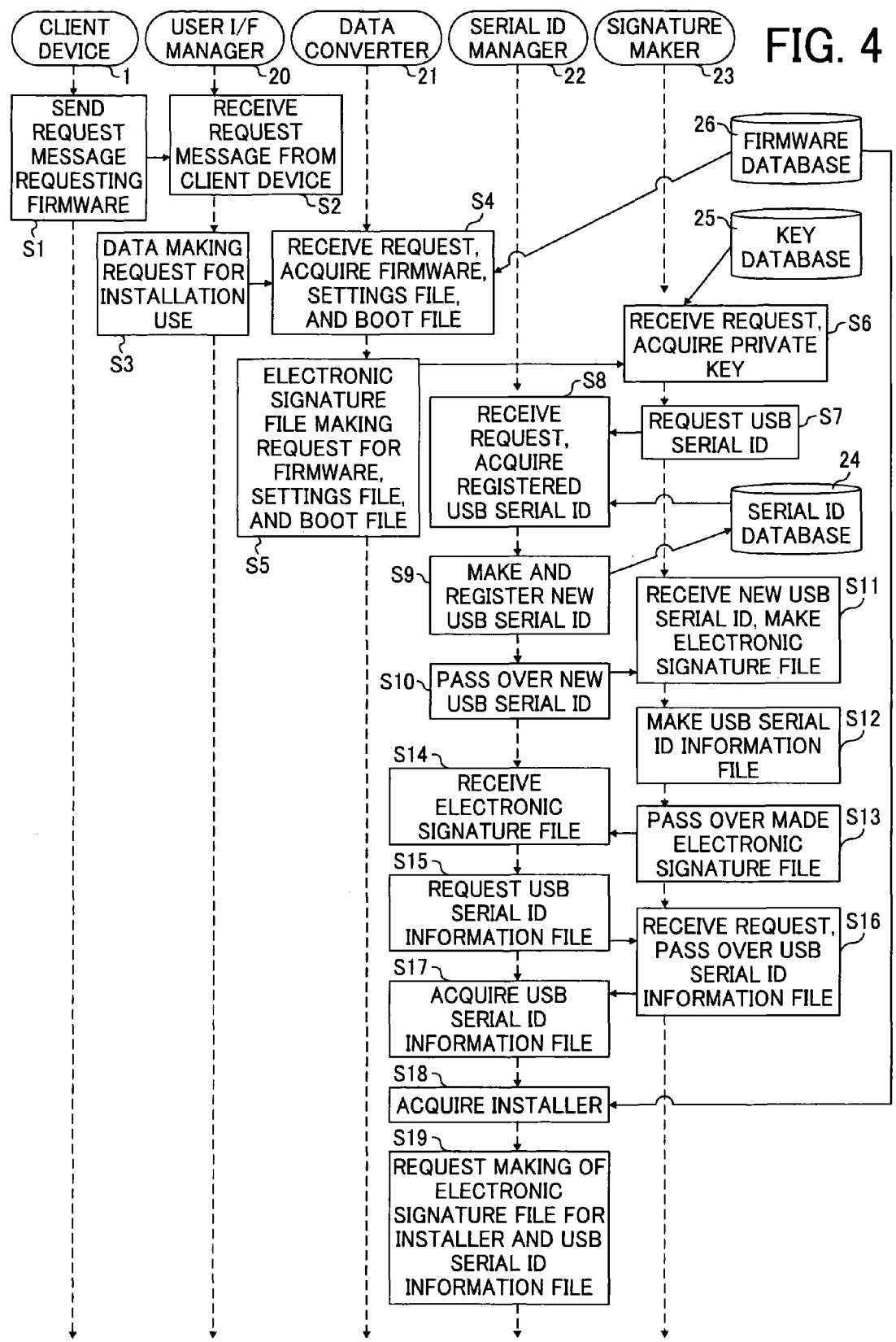
FIG. 4 is a flowchart of an installation license granting processing procedure according to the embodiment.
Figure 5:
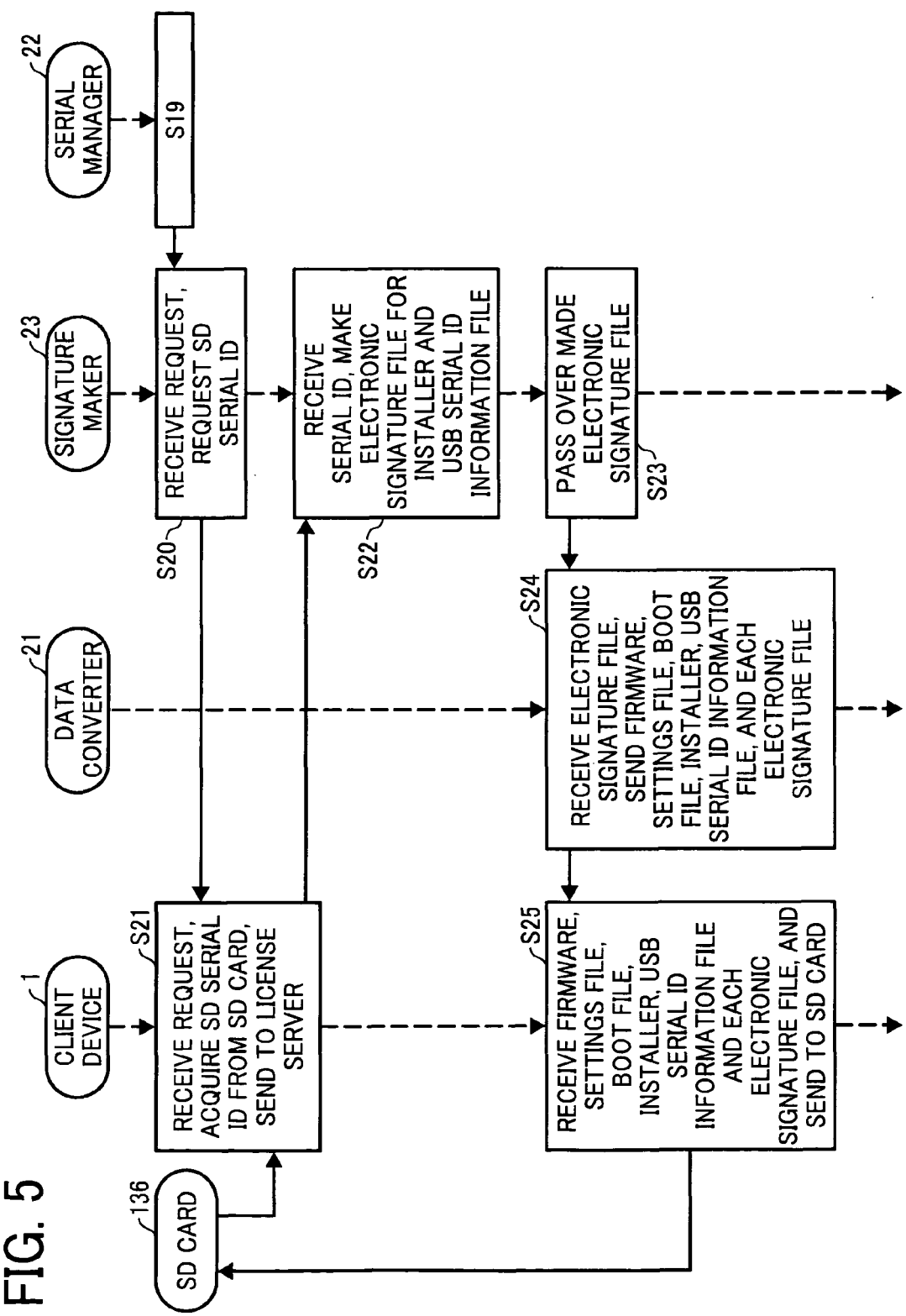
FIG. 5 is a further flowchart of an installation license granting processing procedure according to the embodiment.

The following is an explanation of an installation license granting processing procedure of this embodiment. FIGS. 4 and 5 are flowcharts of an installation license granting processing procedure.

When the user inputs an input operation requesting firmware to be installed at the multi-function machine 31 and inputs product information for the multi-function machine 31 at the client device 1, the client device 1 sends a request message requesting the firmware and including the product information to the license server 2 in response to the input (step S1). It is also possible for a number of multi-function machines 31 to be installed with the firmware to exist. In this case it is taken that there are, for example, five multi-function machines 31 to be installed with the firmware, with the user performing input operations to this effect. On the other hand, when a request message including product information for the multi-function machine 31 is received (step S2), the user I/F manager 20 of the license server 2 requests making of data for installation use to install firmware corresponding to the product information to the data converter 21 (step S3). When a request is received from the user I/F manager 20, the data converter 21 accesses the firmware database 26 and acquires firmware and settings files requested for installation corresponding to the product information together with boot files (step S4). Next, the data converter 21 passes over the firmware, settings files, and boot files acquired in step S4 to the signature maker 23 together with a request to make electronic signature files for these files (step S5). When a request is received from the data converter 21, the signature maker 23 accesses the key database 25 and acquires private keys (step S6). Next, the signature maker 23 requests making of a new USB serial ID to the serial ID manager 22 (step S7). The signature maker 23 then requests the making of five USB serial IDs in order to install the firmware at the five multi-function machines 31. When a request is received from the signature maker 23, the serial ID manager 22 accesses the serial ID database 24 and first acquires the USB serial IDs currently registered (step S8). The serial ID manager 22 then creates new USB serial IDs that do not replicate any of the acquired USB serial IDs and registers the new USB serial IDs in the serial ID database 24 (step S9). Five USB serial IDs are made here. Next, the serial ID manager 22 passes the USB serial IDs newly made in step S9 over to the signature maker 23 (step S10).

When the USB serial IDs are received from the serial ID manager 22, the signature maker 23 makes electronic signature files for the firmware and settings files acquired in step S3 using the USB serial IDs and the private keys acquired in step S4 (step S11). The signature maker 23 then defines file names corresponding to the USB serial IDs for the electronic signature files made for the settings files and makes five electronic signature files. The signature maker 23 then makes electronic signature files for the boot programs that are the boot files and the root file system acquired in step S5 using the product information acquired in step S2 and the private key acquired in step S4. The signature maker 23 then makes a USB serial ID information file indicating the correlation between the USB serial IDs received from the serial ID manager 22 in step S11 and the electronic signature files defining file names corresponding to the USB serial IDs made using the USB serial IDs (step S12). The signature maker 23 then passes over the electronic signature files made in step S12 to the data converter 21 (step S13). Upon receiving the electronic signature files from the signature maker 23 (step S14), the data converter 21 makes a request to the signature maker 23 for USB serial ID information files (step S15). The signature maker 23 then passes the USB serial ID information files made in step S12 over to the data converter 21 upon receiving a request from the data converter 21 (step S16). Upon receiving the USB serial ID information files (step S17), the data converter 21 accesses the firmware database 26 and acquires an installer (step S18). Next, the data converter 21 passes over the USB serial ID information files acquired in step S17 and the installer acquired in step S18 to the signature maker 23 together with a request to make electronic signature files for the USB serial ID information files and the installer (step S19). Upon receiving a request from the data converter 21, the signature maker 23 makes a request to the client device 1 to acquire an SD card serial ID assigned to the SD card 136 and stored in the SD card 136 that is inserted in the client device 1 via the user I/F manager 20 (step S20).

Upon receiving the request, the client device 1 accesses the SD card 136 inserted in the client device 1, acquires the SD card serial ID assigned to the SD card 136, and sends the SD card serial ID to the license server 2 (step S21). When the SD card serial ID is received via the user I/F manager 20, the signature maker 23 of the license server 2 makes electronic signature key files for the USB serial ID information file and the installer acquired in step S18 using the SD card serial ID and the private keys acquired in step S4 (step S22). The signature maker 23 then passes over the electronic signature files made in step S22 to the data converter 21 (step S23). When the electronic signature files are received from the signature maker 23, the data converter 21 sends the firmware, the settings files, the boot files (boot programs and root file system), the installers, the USB serial ID information files and the electronic signature files respectively created responding to the above files to the client device 1 via the user I/F manager 20 (step S24). The client device 1 then stores the data sent from the license server 2 on the SD card 136 (step S25).

Figure 6:
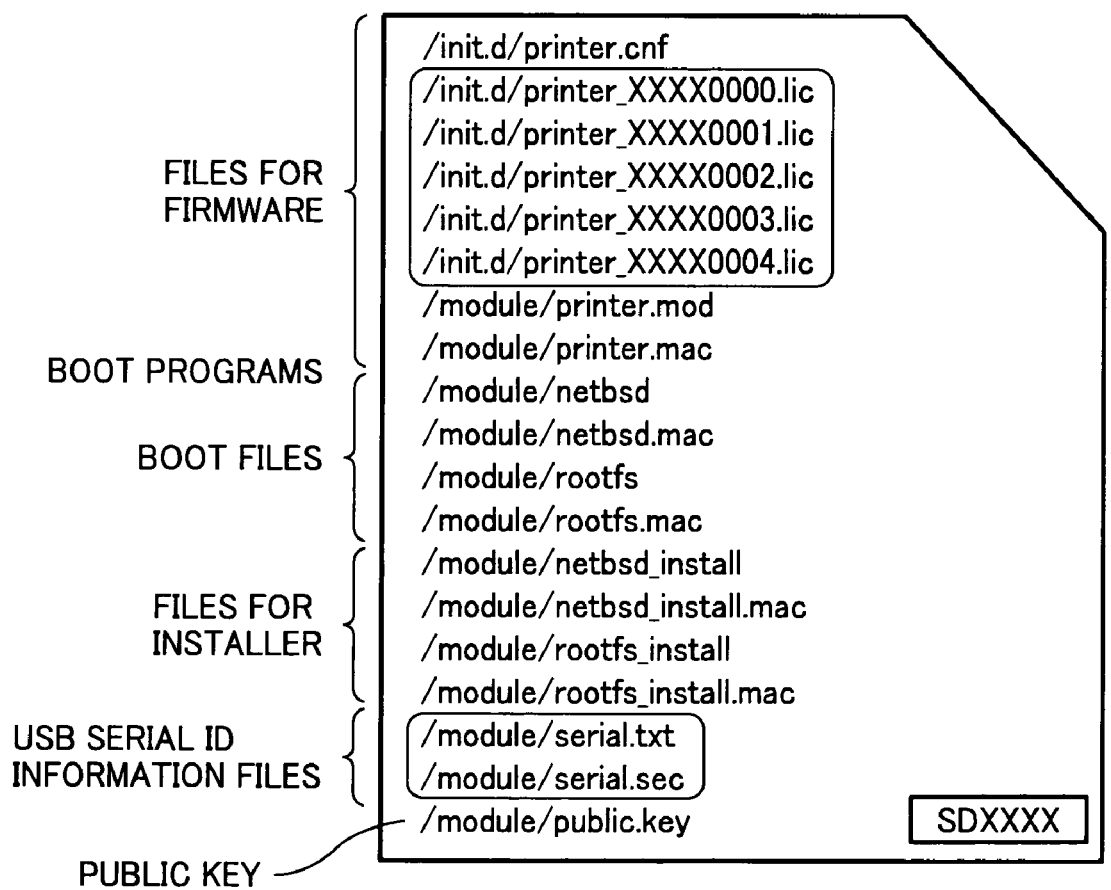
FIG. 6 is a view depicting an example of data stored in an SD card according to the embodiment.

FIG. 6 is a view depicting an example of firmware and settings files, installers, USB serial ID information files, boot programs, and data for each electronic signature file made for each of these files stored in the SD card 136. FIG. 7 is a block view of the data structure shown in FIG. 6 in block form. In the example of FIG. 6, '/init.d/printer.cnf' denotes the firmware settings file. '/init.d/printer_XXXX0000.lic' to '/init.d/printer_XXXX0004.lic' denote electronic signature files that are made using a USB serial ID and utilized in the authentication check for the settings file. In this example, five USB serial card IDs 'XXXX0000' to 'XXXX0004' are made, and file names corresponding to each USB serial ID are assigned to each electronic signature file. While the firmware is being installed in each multi-function machine 31, one of the five electronic signature files is stored in the USB memory 115 and is deleted from the SD card 136 afterwards. '/module/printer.mod' denotes the firmware module of the target of installation. '/module/printer.mac' denotes an electronic signature file that is made using a USB serial ID and utilized in authentication checking of a module for the firmware that is the target of installation. '/module/netbsd' denotes a boot program enabling functioning as the multi-function machine 31. '/module/netbsd.mac' denotes an electronic signature file that is made using the SD card serial ID and utilized in authentication checking of the boot program. '/module/rootfs' denotes a root file system for the boot program. '/module/rootfs.mac' denotes an electronic signature file that is made using the SD card serial ID and utilized in authentication checking of the root file system. '/module/netbed_install' denotes a module used as an installer for firmware that is a target of installation in this embodiment. '/module/netbed_install.mac' denotes an electronic signature file that is made using the SD card serial ID and utilized in authentication checking of the firmware installer. '/module/rootfs_install' denotes a root file system for the firmware installer. '/module/rootfr_install.mac' denotes an electronic signature file that is made using the SD card serial ID and utilized in authentication checking of the root file system of the firmware installer. '/module/serial.txt' denotes a USB serial ID information file. '/module/serial.sec' denotes an electronic signature file that is made using the SD card serial and utilized in authentication checking of the USB serial ID information file. '/module/public.key' denotes a public key that is used in decoding electronic signature files and used in making electronic signature files. 'SDXX000' denotes an SD card serial ID assigned so as to uniquely specify the SD card 136.

FIG. 8 is a view of an example of data for a USB serial ID information file. 'XXXX0000' to 'XXXX0004' denote USB serial IDs. '/init.d/printer_XXXX0000.lic' to '/init.d/printer_XXXX0004.lic' denote file names for electronic signature files made using each USB serial ID for 'printer.cnf'.

As a result of granting one USB serial ID to one USB memory 115 provided within the multi-function machine 31 and making electronic signature files using the USB serial IDs, it is possible to carry out authentication using the USB serial IDs and the electronic signature files and it is therefore possible to install the firmware safely on the multi-function machine 31. Further, by using electronic signature files having file names corresponding to the USB serial IDs as electronic signature files made for the settings files, it is possible to acquire only electronic signature files that have a correspondence relationship with the USB serial IDs at the multi-function machines 31. Unauthorized copying of the electronic signature files can therefore be made impossible and as a result it is possible to control unauthorized copying and falsification of firmware. It is therefore possible to take over from the conventional device where the firmware was stored in the SD card 136 and make it possible to install firmware safely on a storage medium (USB memory 115) provided within the multi-function machine 31. Usefulness to the user is also improved because it is possible to store information in order to perform installation on several multi-function machines 31 on a single SD card 136.

The present invention is by no means limited to each of the above preferred examples and various modifications cited by example below are possible.

Figure 9:
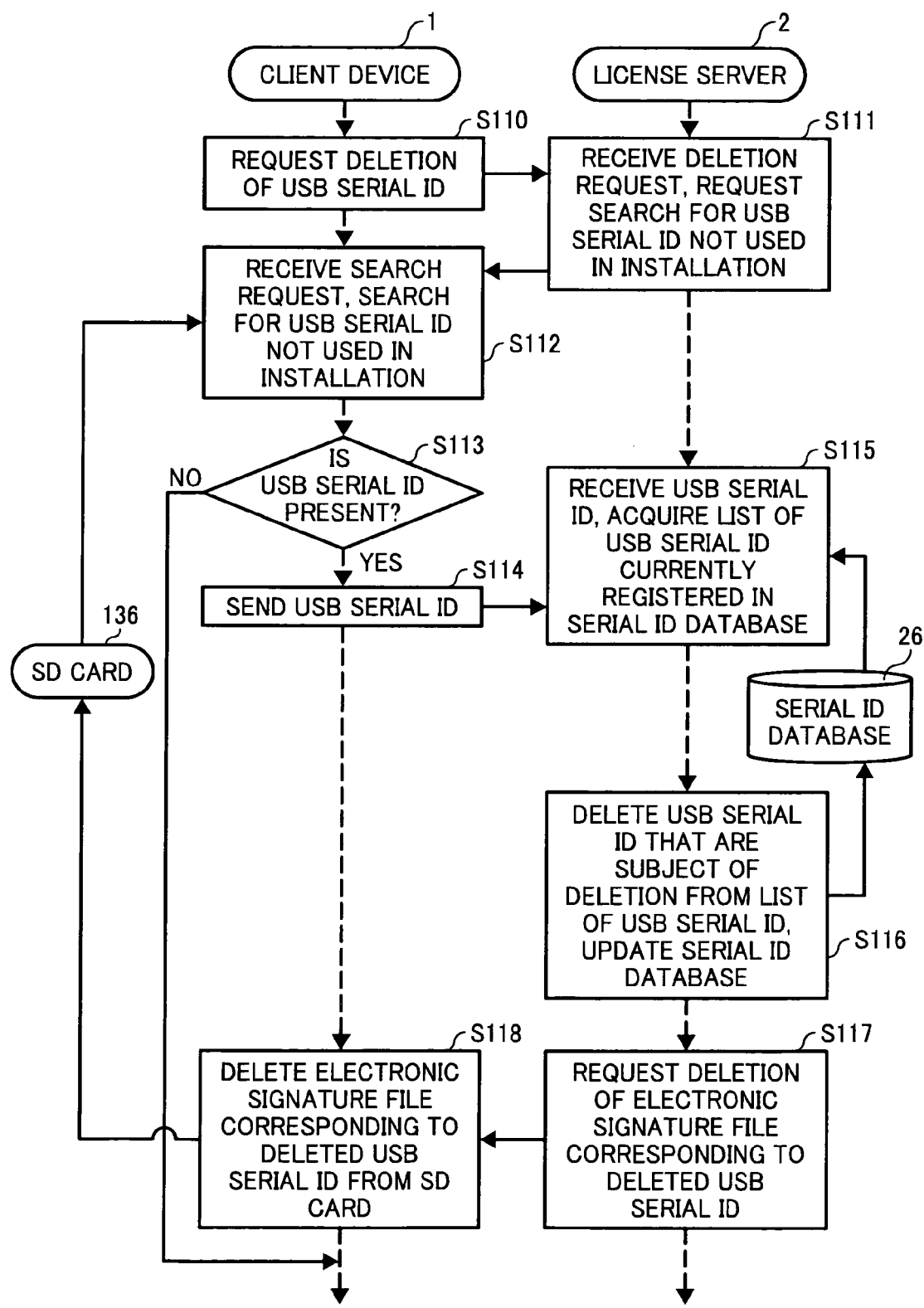
FIG. 9 is a flowchart of a license deletion processing procedure according to the embodiment.

In the above embodiment, it is also possible for USB serial IDs of the USB serial IDs made in the installation license granting processing and not used in the installation to be deleted from the serial ID database. FIG. 9 is a flowchart of a license deletion processing procedure that deletes USB serial IDs not used in the installation from the serial ID database 24.

At the client device 1 configured with the SD card 136, when the user carries out an operation requesting deletion of USB serial IDs, the client device 1 requests deletion of the USB serial IDs to the license server 2 (step S110). Upon receiving the request, the license server 2 requests the client device 1 to search for USB serial IDs not used in the installation (step Sill). The client device 1 then accesses the SD card 136 and searches for electronic signature files stored in the SD card 136 of the electronic signature files (for example, '/init.d/printer_XXXX0000.lic' to '/init.d/printer_XXXX0004.lic') with file names described in the USB serial ID information files stored in the SD card 136 (step S112). In other words, in the event that the electronic signature file is used during installation of the firmware to the multi-function machine 31, the electronic signature file is not stored in the SD card 136 because the electronic signature file is deleted from the SD card 136 after being stored in the USB memory 115. It is therefore possible to specify USB serial IDs not used in the installation by searching for electronic signature files stored in the SD card 136 that were not used in the installation. The client device 1 therefore searches for such electronic signature files. When the result of the search is that one or more electronic signature files (at least one of '/init.d/printer_XXXX0000.lic' to '/init.d/printer_XXXX0004.lic') are present (step S113: Yes), the client device 1 determines the USB serial ID (at least one of 'XXXX0000' to 'XXXX0004') of the electronic signature file based on the USB serial ID information file and sends the USB serial ID to the license server 2 (step S114). Upon receiving the USB serial ID from the client device 1, the license server 2 accesses the serial ID database 24 and acquires a list of currently registered USB serial IDs (step S115). Next, the license server 2 deletes the USB serial ID received in step S115 from the list of USB serial IDs acquired in step S115. The license server 2 then saves the list of USB serial IDs with the USB serial ID deleted to the serial ID database 24 and updates the serial ID database 24 (step S116). The license server 2 then makes a request to the client device 1 to delete the electronic signature file the file name of which is described in the USB serial ID information file corresponding to the USB serial ID deleted in step S116 (step S117). Upon receiving the request, the client device 1 accesses the SD card 136 and deletes the electronic signature file from the SD card 136 (step S118). The file name of the electronic signature file is not deleted from the USB serial ID information file.

It is therefore possible to reuse USB serial IDs not used in the installation and resources can therefore be effectively utilized.

Figure 10:
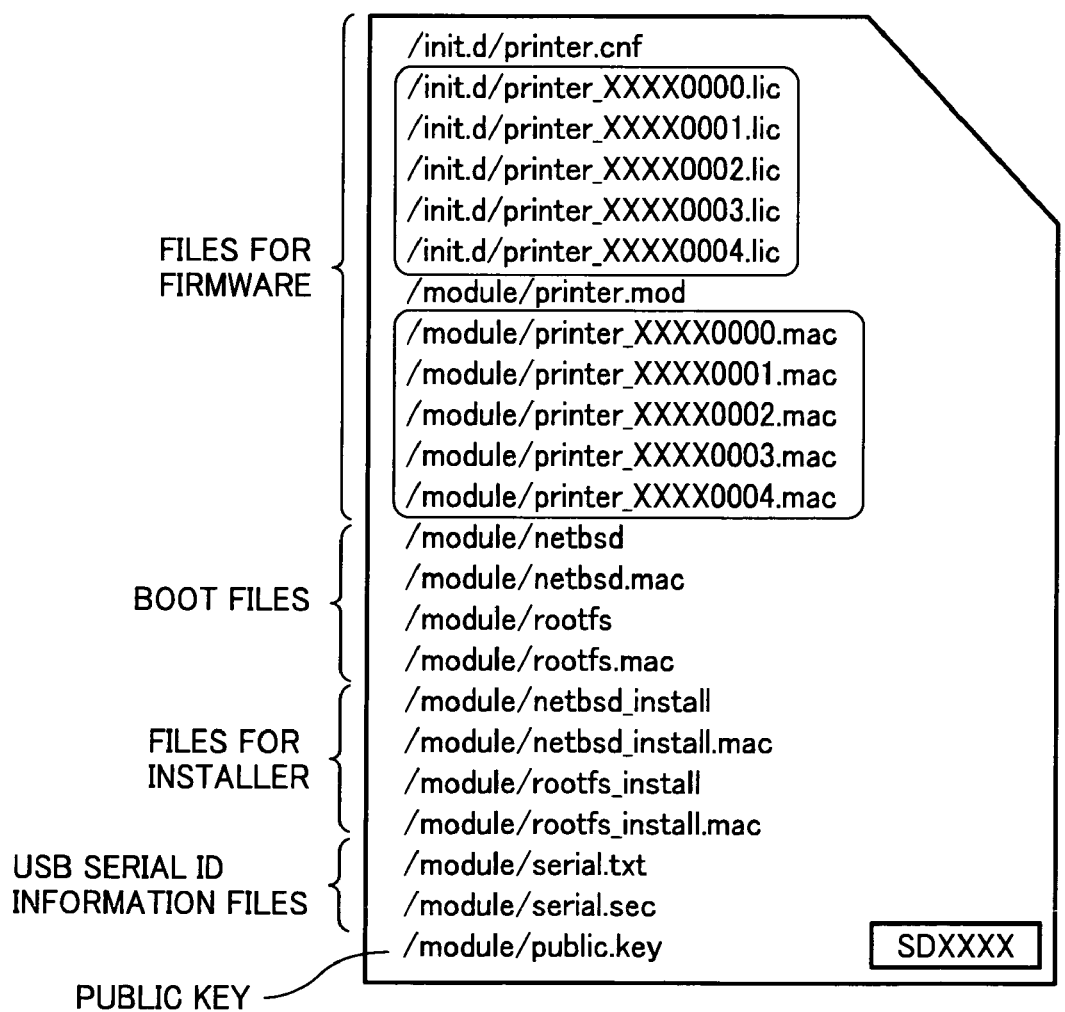
FIG. 10 is a view depicting an example of data stored in an SD card of a modified example according to the embodiment.

In the embodiment, electronic signature files for the firmware settings file '/init.d/printer/cnf' are made with file names corresponding to the USB serial ID's. It is, however, also possible for the electronic signature files for the firmware module '/module/printer.mod' to similarly have file names corresponding to the USB serial ID. FIG. 10 is a view depicting an example of firmware and settings files, installers, USB serial ID information files, boot programs, and data for each electronic signature file made for each of these files stored in the SD card 136 in the modified example. FIG. 11 is a block view of the data structure shown in FIG. 10 in block form. In this modified example, as shown in FIG. 10, file names '/init.d/printer_XXXX0000.lic' to '/init.d/printer_XXXX0004.lic' for the electronic signature files made using each of the USB serial IDs with respect to 'printer.cnf' are shown to respectively correlate to each of the USB serial IDs 'XXXX0000' to 'XXXX0004'. The file names '/module/printer_XXXX0000.mac' to '/module/printer_XXXX0004.mac' for the electronic signature files made using each of the USB serial IDs with respect to '/module/printer.mod' are also then shown to respectively correlate to each of the USB serial IDs 'XXXX0000' to 'XXXX0004'.

It is therefore possible to acquire only electronic signature files having a correspondence relationship with the USB serial ID at the multi-function machine 31. Unauthorized copying of the electronic signature files can therefore be made impossible and as a result it is possible to control unauthorized copying and falsification of firmware.

The file names of the electronic signature files are made to correspond with USB serial IDs but the embodiment is by no means limited in this respect.

In the embodiment, firmware that is the target of installation is the same for all of the multi-function machines 31 but it is also possible to install different firmware at each multi-function machine 31. In this case, which firmware is to be installed at each multi-function machine 31 can be specified in advance at the client device 1. It is also possible for the number of items of firmware installed at each multi-function machine 31 to be different for each of a number of multi-function machines 31. In this case, the number of electronic signature files correlated to each USB serial ID are respectively different for the USB serial ID information files made by the signature maker 23 in step S12. The number of items of firmware that can be installed at one multi-function machine 31 is by no means limited to one, and can be more than one.

A description is given in the above embodiment of the case of storing firmware to be installed on the multi-function machine 31 in the SD card 136. The above structure can also be applied to the case of storing firmware to be installed not on the multi-function machine 31 but on the information processing device on the SD card 136.

In the embodiment, the license server 2 stores information for installing the firmware on the multi-function machine 31 on the SD card 136 via the client device 1. However, it is also possible to provide a card slot enabling the SD card 136 to be inserted in a detachable manner at the license server 2, with the license server 2 then storing information for installing firmware on the multi-function machine 31 on the SD card 136 inserted in the card slot of the license server 2.

In the above embodiment, the installer and the boot files are stored on the firmware database 26 of the license server 2 but can also be stored in a further storage region of the HDD.

According to the embodiment of the present invention, program information including first license information, second license information, and a target program is stored on a detachable storage medium. It is therefore possible to replace the technology of the conventional art where programs executed by information processing devices such as an image forming device are safely stored on a detachable storage medium, and it is possible so safely install the target program on a storage medium within the information processing device.

According to the embodiment of the present invention, by storing correspondence relationship information on a storage medium, it is possible to store a first electronic signature on the information processing device according to a correspondence relationship indicated in the correspondence relationship information while installing the target program on the information processing device. It is therefore possible to suppress unauthorized duplication of the target program. The same also applies for the third electronic signature.

According to the embodiment of the present invention, by using identification information for the information processing device, it is possible to carry out authentication checks using each item of identification information and install the target program on each information processing device even when information for installing target programs on a number of information processing devices is stored on a single storage medium. It is therefore possible to improve usefulness without detriment to the safety of the program.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for storing a program targeted for installation on a first information processing device in a detachable storage medium, the apparatus comprising:
    an identification information unit that generates identification information for the first information processing device that is a target of installation;
    a medium identification information unit that acquires storage medium identification information assigned to the storage medium and stored in the storage medium;
    a first license unit that generates a first electronic signature for authentication checking of the target program using the target program and the identification information, and the first license unit generates first license information including the first electronic signature using the identification information generated by the identification information unit;
    a second license unit that generates second license information using the storage medium identification information acquired by the medium identification information unit; and
    a storage controller that stores, in the storage medium, the first license information including the first electronic signature generated by the first license unit, the second license information generated by the second license unit, and program information including the target program.

2. The apparatus according to claim 1, wherein the medium identification information unit acquires the storage medium identification information assigned to the storage medium and stored in the storage medium via a second information processing device having the storage medium therein; and
    the storage controller stores the first license information, the second license information and the program information in the storage medium via the second information processing device.

3. The apparatus according to claim 1, further comprising a first correspondence relationship information unit that generates correspondence relationship information indicating a correspondence relationship of the first electronic signature and the identification information,
    wherein the storage controller stores the first license information, the second license information, the correspondence relationship information and the program information in the storage medium.

4. The apparatus according to claim 1, wherein the program information includes a settings file used to execute the target program, the first license unit generates a second electronic signature using the settings file and the identification information and generates the first license information including the second electronic signature.

5. The apparatus according to claim 4, wherein the second electronic signature is used in authentication checking of the settings file.

6. The apparatus according to claim 4, further comprising a second correspondence relationship information unit that generates correspondence relationship information indicating a correspondence relationship of the second electronic signature and the identification information,
    wherein the storage controller stores, in the storage medium, the first license information, the second license information, the correspondence relationship information and the program information.

7. The apparatus according to claim 1, wherein the program information includes an installer that installs the target program in the first information processing device, and the second license unit generates a third electronic signature using the installer and the storage medium identification information and generates the second license information including the third electronic signature.

8. The apparatus according to claim 7, wherein the third electronic signature is used in authentication checking of the installer.

9. The apparatus of claim 1, wherein the first license unit generates a file name of the first electronic signature as including the identification information of the first information processing device.

10. The apparatus of claim 1, wherein the first license unit receives at least one private key and generates the first electronic signature based on the identification information and the at least one private key.

11. A method for storing a program targeted for installation on an information processing device in a detachable storage medium, the method comprising:
generating identification information for the information processing device that is a target of installation;
acquiring storage medium identification information assigned to the storage medium and stored in the storage medium;
generating a first electronic signature for authentication checking of the target program using the target program and the identification information and generating first license information including the first electronic signature using the identification information;
generating second license information using the acquired storage medium identification information; and
storing, in the storage medium, the generated first license information including the first electronic signature, the generated second license information and program information including the target program.

12. The method according to claim 11, wherein the acquiring the storage medium identification information includes acquiring the storage medium identification information assigned to the storage medium and stored in the storage medium via a second information processing device having the storage medium therein; and
the storing includes storing the first license information, the second license information and the program information in the storage medium via the second information processing device.

13. The method according to claim 11, further comprising generating correspondence relationship information indicating a correspondence relationship of the first electronic signature and the identification information,
wherein the storing includes storing the first license information, the second license information, the correspondence relationship information and the program information in the storage medium.

14. The method according to claim 11, wherein the program information includes a settings file used to execute the target program, and
the generating the first license information step includes generating a second electronic signature using the settings file and the identification information and generating the first license information including the second electronic signature.

15. The method according to claim 14, wherein the second electronic signature is used in authentication checking of the settings file.

16. The method according to claim 14, further comprising generating correspondence relationship information indicating a correspondence relationship of the second electronic signature and the identification information,
wherein the storing includes storing, in the storage medium, the first license information, the second license information, the correspondence relationship information and the program information.

17. The method according to claim 11, wherein the program information includes an installer that installs the target program in the first information processing device, and
the generating the second license information includes generating a third electronic signature using the installer and the storage medium identification information and generating the second license information including the third electronic signature.

18. The method according to claim 17, wherein the third electronic signature is used in authentication checking of the installer 19. The method of claim 11, wherein the generating the first license information step includes generates a file name of the first electronic signature as including the identification information of the first information processing device.

20. The method of claim 11, wherein the generating the first license information step includes receives at least one private key and generating the first electronic signature based on the identification information and the at least one private key.

* * * * *